US005812989A

United States Patent [19]
Witt et al.

[11] Patent Number: 5,812,989
[45] Date of Patent: Sep. 22, 1998

[54] IMAGE STATEMENT PREPARATION BY WORK FLOW MANAGEMENT USING STATEMENT CYCLES AND STATEMENT INTERACTIVE SESSIONS

[75] Inventors: Dale Edward Witt, Charlotte, N.C.; Judy James Potter, Palentine, Ill.; Chung-Hsi Wang, Charlotte, N.C.

[73] Assignee: International Business Machines Corporation, Armonk, N.Y.

[21] Appl. No.: 554,263

[22] Filed: Nov. 6, 1995

(Under 37 CFR 1.47)

Related U.S. Application Data

[63] Continuation of Ser. No. 175,031, Dec. 29, 1993, abandoned.

[51] Int. Cl.⁶ .................................................... G06F 17/60
[52] U.S. Cl. .............................................................. 705/45
[58] Field of Search ........................ 705/40, 45; 382/138, 382/137, 140

[56] References Cited

U.S. PATENT DOCUMENTS

| | | | |
|---|---|---|---|
| 4,813,077 | 3/1989 | Woods et al. | 382/138 |
| 5,208,869 | 5/1993 | Holt | 382/138 |
| 5,237,158 | 8/1993 | Kern et al. | 705/45 |
| 5,237,159 | 8/1993 | Stephens et al. | 705/30 |
| 5,287,497 | 2/1994 | Behera | 707/104 |
| 5,321,816 | 6/1994 | Rogan et al. | 705/42 |

OTHER PUBLICATIONS

Susan Price, "Bank of Boston's Imaging Rids Fraud", Bank Systems & Technology, 2 pages, Mar. 1996.

"City Holding Opts For DSI's Image", Bank Systems & Technology, 2 pages, Mar. 1996.

"Image Archive Yields Faster Retrieval", Bank Systems & Technology, 1 page, May 1996.

Jacqueline Day, "Chase's Imaging at Heart of Three–Pronged Check Process", 2 pages, Mar. 1995.

Item Processing Report, "Image Check Statement Program Announcements Snowball", Phillips Publishing, Inc., 2 pages, Mar. 19, 1992.

*Primary Examiner*—Robert A. Weinhardt
*Assistant Examiner*—Alexander Kalinowski
*Attorney, Agent, or Firm*—Kenneth A. Seaman; Calfee, Halter & Griswold

[57] ABSTRACT

An image statements preparation process and system uses a profile management facility for assigning system management profiles including statement group cycle profiles to group multiple statements according to cycles for preparation and processing, and to allow statements preparation work to be performed concurrently upon successive and overlapping statement cycles. A statements interactive session workstation and host are provided to allow profile-managed operator selection of statements by statement cycles on which data, including image data, reconciliation work is required. A statements interactive session workstation display presents account information including missing image items along with a list of unassigned image items so that image reconciliation can be performed by a statements interactive session operator. Missing image items can be scanned into memory at the statements interactive session workstation. Additional profiles are used to provide easy access and security authorization to statement interactive session workstation operators.

21 Claims, 11 Drawing Sheets

| STATEMENT CYCLE NAME PROFILE ||||||||
|---|---|---|---|---|---|---|---|
| STATEMENT CYCLE NAME | TEXT ID | RESOURCE LIST - DSAT NAMES ||||| USE FLAG |
| NAME 1 | TEXT ID 1 | ASF1 | IAKF1 | REC. FILE 1 | RSDF 1 | AUDIT FILE 1 | 1 |
| NAME 2 | TEXT ID 2 | ASF2 | IAKF2 | REC. FILE 2 | RSDF 2 | AUDIT FILE 2 | 2 |
| NAME 3 | TEXT ID 3 | ASF4 | IAKF4 | REC. FILE 3 | RSDF 3 | AUDIT FILE 3 | 3 |

FIG. 2B

| STATEMENT CYCLE GROUP PROFILE ||
|---|---|
| STATEMENT CYCLE GROUP NAME | STATEMENT CYCLE NAME |
| GROUP 1 | NAME 1 |
| GROUP 1 | NAME 2 |
| GROUP 2 | NAME 1 |
| GROUP 2 | NAME 2 |

FIG. 2C

| STATEMENT OPERATOR PROFILE | | |
|---|---|---|
| OPERATOR | | STATEMENT CYCLE GROUP NAME |
| OPERATOR 1 | | GROUP 1 |
| OPERATOR 2 | | GROUP 2 |
| OPERATOR 3 | | GROUP 3 |

FIG. 2D

| NLS TEXT PROFILE | | | |
|---|---|---|---|
| TEST ID | LANGUAGE CODE | LENGTH | TEXT |
| TEST ID 1 | LANGUAGE CODE 1 | LENGTH 1 | TEXT 1 |
| TEST ID 2 | LANGUAGE CODE 2 | LENGTH 2 | TEXT 2 |
| TEST ID 3 | LANGUAGE CODE 3 | LENGTH 3 | TEXT 3 |

Open Account For Statement Cycle B1C1

Routing/Transit Number

Account Number

Exceptions

Status

| | |
|---|---|
| Available | |
| 12345678901234567 8 | In Use |
| 1234567890123456 7 | Forced |
| 123456789012345 6 | Held |
| 12345678901234 5 | Suspended |
| 1234567890123 4 | |

LIST AVAILABLE

LIST MY SUSPENDED

LIST HELD

LIST ALL

Open        Cancel        Help

| FIG. 6A | FIG. 6B |

IMAGE STATEMENT PREPARATION BY WORK FLOW MANAGEMENT USING STATEMENT CYCLES AND STATEMENT INTERACTIVE SESSIONS

This application is a continuation of application Ser. No. 08/175,031, filed Dec. 29, 1993, now abandoned.

FIELD OF THE INVENTION

The present invention relates generally to processing of account statements and images and, in particular, to high volume parallel batch processing of multiple concurrent account statements in production work cycles.

BACKGROUND OF THE INVENTION

Coprocessing and preparation of multiple account statements of multiple statement cycles presents many operational and logistical difficulties. Statement cycles consist of a batch of statements to be prepared and printed at a common time, usually to meet a specific mailing date. Many institutions find that they have more than one statement cycle in processing at one time, owing to the fact that preparation of a statement cycle may take several days. Such work load conditions may be caused by protracted cycles which overlap, or excessively large cycles requiring subsetting (as may exist in large institutions or institutions acting as service bureaus for several institutions). Significant operational difficulties are encountered with present systems when ramping up to full statements production while continuing processing of overlapping cycles, particularly in large volume applications. Present systems can be used for low to moderate volumes, but suffer significant operational bottlenecks when applied to large volumes. Specifically, present systems are inadequate for handling multiple statement cycles which span three to five days for processing and which consequently may overlap into the production schedule of a subsequent cycle. In particular, management and selection of multiple data sets containing necessary statement cycle information is a complex data processing operation too complicated to be performed by users not specially trained in data processing such as data processing terminal operators.

Present image statement production systems do not provide means for grouping required data of multiple concurrent statement cycles. Nor do present systems provide easy authorized access to and arrangement of grouped data to all staff skill levels. Such features are desirable to improve operational flexibility and efficiency in high volume applications with overlapping statement cycle production.

Document imaging systems which operate in conjunction with automated document reader/sorter machines produce document images which must be reconciled with statements on which the images are to be printed. However, present statements production systems do not provide a system for easy operator guided statements image reconciliation work to be performed integral with the statements production process.

SUMMARY OF THE INVENTION

The present invention provides a method and system of subsetting and controlling a statements production operation for processing by preparatory programs to define a work set, statement interactive sessions for performing statement reconciliation work, and batch programs for producing final printed statements.

In accordance with one aspect of the invention, statement assembly work to be performed is grouped into subsets of statement cycles. Each statement cycle is named and controlled through the use of control tables called profiles. The profiles along with a supporting code provide a technique for naming, access authorization, selection and recovery protection for each statement cycle.

A preparatory statements extract program creates one of plural input data sets for a statements match operation by assigned statement cycle names, thereby eliminating the need for a check processing control system (CPCS) operator to know an output data set name. The match program may be started using a statement cycle name as a parameter, also to eliminate the need for an operator to know a data set name.

In accordance with another aspect of the invention, a statements interactive session (SIS) workstation is provided through which a SIS operator is presented a statement cycle selection menu when a statement reconciliation function is selected. Access to statement cycles is controlled by displaying only statement cycle names for which the operator has access authority. A statement cycle is activated by selection from a list displayed at the workstation. Individual accounts contained in an activated statement cycle can be opened for reconciliation operations (e.g., assignment of free (unassigned) image items to corresponding statements, and formation and assignment of missing image items), thereby providing access at a proper level for the authorized operators and providing full access to all statements of authorized statement cycles.

In accordance with another aspect of the invention, a format image statement (FIS) program may be initiated by a statement cycle name as an identifying parameter, also to eliminate the need for the operator to know the data set names for a given statement.

In accordance with still another aspect of the invention, statement cycles are defined through the use of a statement cycle profile which contains a row for each statement cycle describing the characteristics, requirements and status of that statement cycle, each profile row containing a profile name, descriptive text identifier, information concerning the resources (data sets and other resources) used by this statement cycle, and a locking mechanism to prevent alteration while in use or prior to being ready for use.

In accordance with still another aspect of the invention, a statement cycle group profile associates statement cycles together into groups for convenience of granting access to workstation operators and to facilitate control of access to the statement cycles. The operator profile used to hold the operator's password and other access information holds the name or names of the statement cycle groups (and therefore statement cycles) to which this operator will have access.

In accordance with still another aspect of the invention, a statements interactive session (SIS) is performed for reconciliation of statements with missing and/or free images. Statement interactive sessions are conducted through a host component in communication with a workstation component to enable an operator at a workstation to reconcile an image statement by displaying a list of missing and/or free image items for each statement having image exceptions (no image or the wrong image) to the workstation. The SIS operation of the statements production system allows the operator to perform a variety of functions to reconcile a statement by matching free image items with missing image items, displaying free item images, and scanning in images of missing items for on-screen matching. By display of free item images, operators can determine matches to satisfy missing items. If the physical document of a missing item is located, the operator can use the scanning function of the SIS to create an image of the item which can them be stored in an image database by the SIS and later included on the customer statement.

To the accomplishment of the foregoing and related ends, the invention comprises the features hereinafter fully described and particularly pointed out in the claims, the following description and the annexed drawings setting forth in detail a certain preferred embodiment of the various elements of the invention indicative of but one way in which the principles and concepts of the invention may be employed.

DETAILED DESCRIPTION OF THE PREFERRED EMBODIMENT

Automated processing of checks by banks acting as check clearing members of the Federal Reserve System is a large and complex process requiring handling and data processing of millions of documents daily, all of which must be performed of course prior to preparation of statements reporting payments made by checks. Automated check processing machines rapidly move large volumes of checks along a processing line which includes devices for reading information from each check, such as account and payment data magnetically encoded on the checks, and eventually to sort the checks by account or statement. Additional operations of automated check processing systems include optical character recognition (OCR) to automatically read alphanumeric characters appearing on checks, microfilming of each check to create archival records, and video imaging of each check. Optical scanning and character recognition techniques may also be used in automated check processing to perform identification and verification of handwritten data such as amounts and signatures as is necessary to maintain accuracy of performance of such systems.

Recently, check imaging as performed within a check processing system has been applied to the production of image statements whereby images of checks cleared through an account are provided to the account holder by printing check images along with ordinary alphanumeric statement data to allow for check truncation while still providing an actual image of paid on instruments.

The preparation of image statements is a complicated process requiring, in addition to image data for each item, a system for correlating corresponding non-image data to acquired images formatting the statements for printing of both image and non-image data. An image statements preparation system is preferably interfaceable with existing check processing systems and, therefore, must be capable of keeping up with the processing rate of automated check processing systems.

Figures 1, 1A:
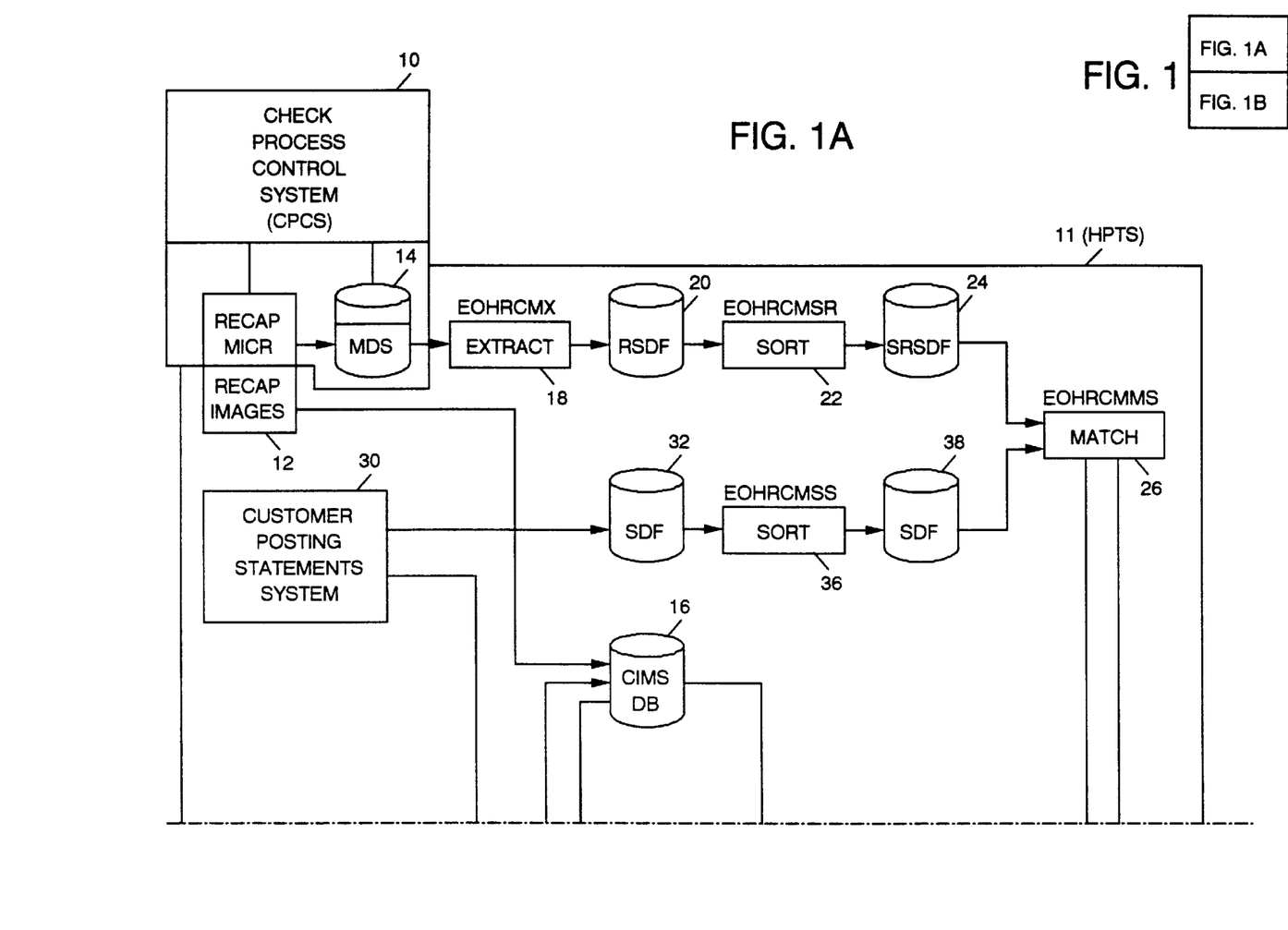
FIGS. 1, 1a & 1b are a schematic diagram of operations of an image statements preparation system in connection with a check processing control system.
Figure 1B:
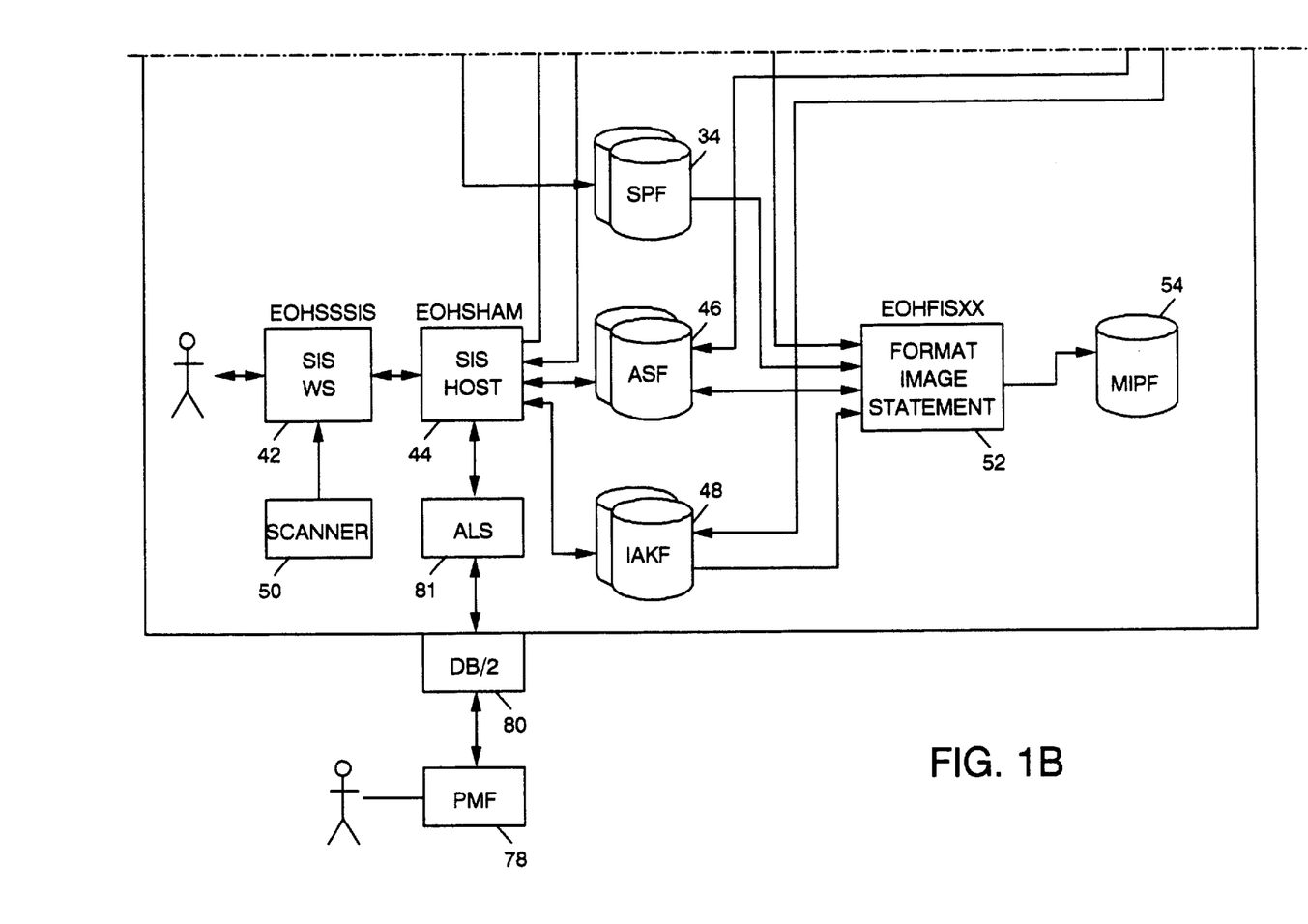

FIG. 1 is a high level schematic drawing of the processes and data files used by a check process control system (CPCS) 10 in conjunction with a complementary image statements production system such as, for example, the IBM Image Plus® High Performance Transaction System (HPTS®) 11, which captures and manages document images and integration of images with statements data acquired by the CPCS to produce image statements. The HPTS 11, in addition to an image statements program, includes a plurality of application library services (ALS) 81 which includes, for example, a program for document image management in a document image database used in matching image data to corresponding statement data as described below.

A statement data recapture operation 12 performs recapture of statement data acquired by a magnetic ink character recognition (MICR) device and an optical scanner in a check processing machine of the CPCS such as, for example, an IBM 3890 document reader/sorter, to compile a mass data storage (MDS) 14 of all the data acquired by the MICR, and a check image management system (CIMS) database 16 of all data acquired through image scanning operations of the automated check processing machine. The recapture operation 12 assigns an image data sequence number to corresponding MICR data for matching to corresponding data in the CIMS database. A statements extract program (SEP) 18 of the HPTS reads data selected from the MDS for a particular recapture operation specific to one statement cycle and creates a file for input of data to a recapture statement data file (RSDF) 20 (i.e., a list of items with images) of the MICR data for one statement cycle with CPCS assigned sequence numbers. The SEP 18 creates the input data sets by assigned statement cycle names. A sort operation 22 sorts the selected statement cycle data by the MICR numbers by account numbers and routing transit codes to create a sorted recapture statement data file (SRSDF) 24 on which a match program 26 operates to match related data as described below.

Figure 2A:
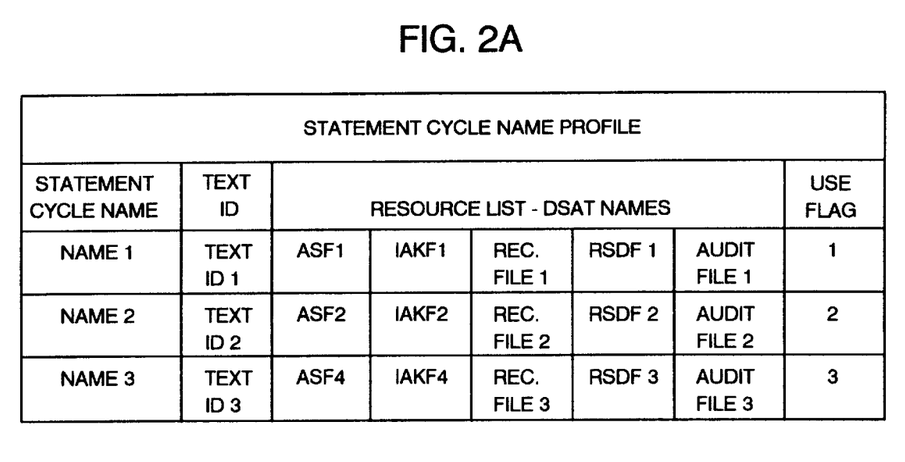
FIGS. 2A–2D illustrate control profile tables use by the image statements preparation system.
Figure 2B:
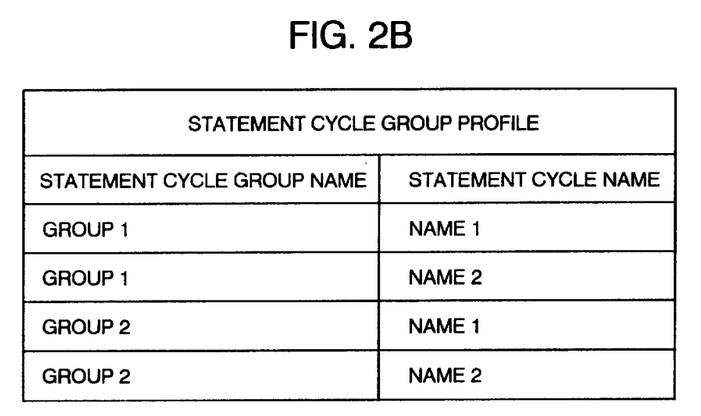
Figure 2C:
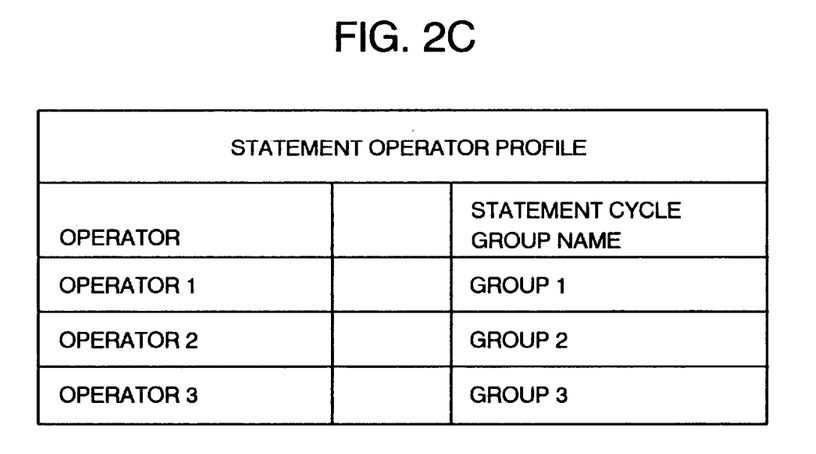
Figure 2D:
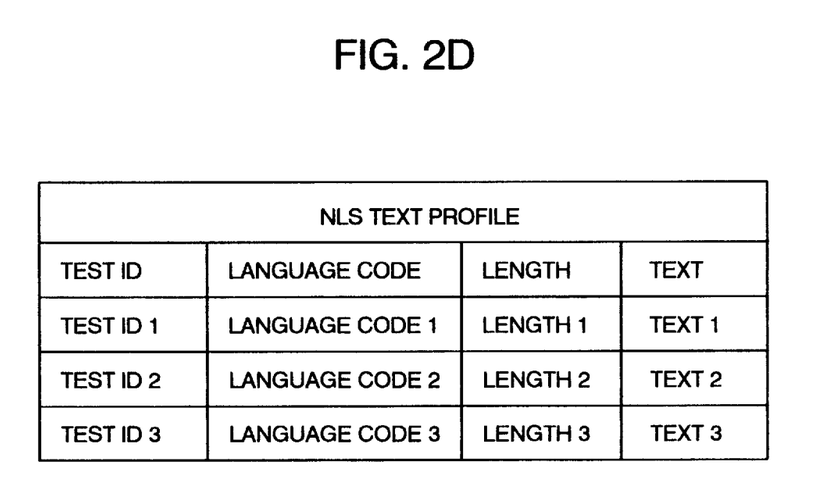

Parameters for various statement cycle profiles, as shown in FIGS. 2A–2D, defined by a profile management facility (PMF) 78 are input by a PMF operator to provide profile data, for example in the form of DB/2 tables, to the HPTS DB/2 database 80. Each of the statement cycle profiles of FIGS. 2A–2D contain rows for each statement cycle describing the characteristics, requirements and status of that statement cycle. For example, as shown in FIG. 2A, in Statement Cycle Name Profiles, each row contains the profile's name, provides a descriptive text identifier (e.g., for a national language support (NLS) enablement), gives information concerning the resources (data sets and other resources) used by this statement cycle, and includes a locking mechanism indicated by a "Use Flag" column to prevent alteration while a statement cycle in use or prior to being ready for use. To facilitate control of access by HPTS operators to the statement cycles, a Statement Cycle Group Profile (SCGP) as shown in FIG. 2B associates statement cycles together into groups so that, for example, a group of statement cycles having identical access authorization requirements may be accessed together. As shown in FIG. 2C, a Statement Operator Profile is used to hold the operator's password and other access information holds the name or names of the statement cycle groups (and therefore statement cycles) to which an authorized operator will have access. Additionally, for each text identifier as listed by the statement cycle name profiles, a NLS Text Profile as shown in FIG. 2D can be provided to translated descriptive text in languages appropriate to the native language of the terminal operator.

Referring again to FIG. 1, a customer posting statements system (CPSS) 30, such as conventional non-image statements generating systems presently in use and well known in the art, posts data for statement bodies to a statement print file (SPF) 34 of data of the alphanumeric contents of the statement (without images) to be printed. In the HPTS, the CPSS 30 is modified to also generate a statements data file (SDF) 32, which is a list of all of the items in the statements sent to the SPF, which is then sorted in sort operation 36 for loading to a customer statement data file 38 on which match program 26 operates to match data called for by the original statements program of the CPSS 30 to a list of images in the SRSDF 24. The CPSS 30 is further modified to include image markers in the data sent to the SPF 34 which indicate where images are to be placed within the statements formatted by the FIS. By this arrangement, existing CPSSs can be readily interfaced with the HPTS.

As an integral part of the HPTS, a statement interactive session (SIS) system, indicated generally at 40, includes an SIS operator workstation 42 which runs under the OS/2 environment and is linked to an SIS host system 44 which runs under MVS/ESA and communicates to the SIS workstation 42 using LU 6.2. The SIS host 44 accesses an account summary file (ASF) 46 which is a list of statements including statement status, such as complete or missing an image item or items or free image items which do not match the statement data. The ASF is updated by the results of match operation 26, to allow identification of statements which are in need of reconciliation work to be performed through the SIS workstation 42.

Figure 3:
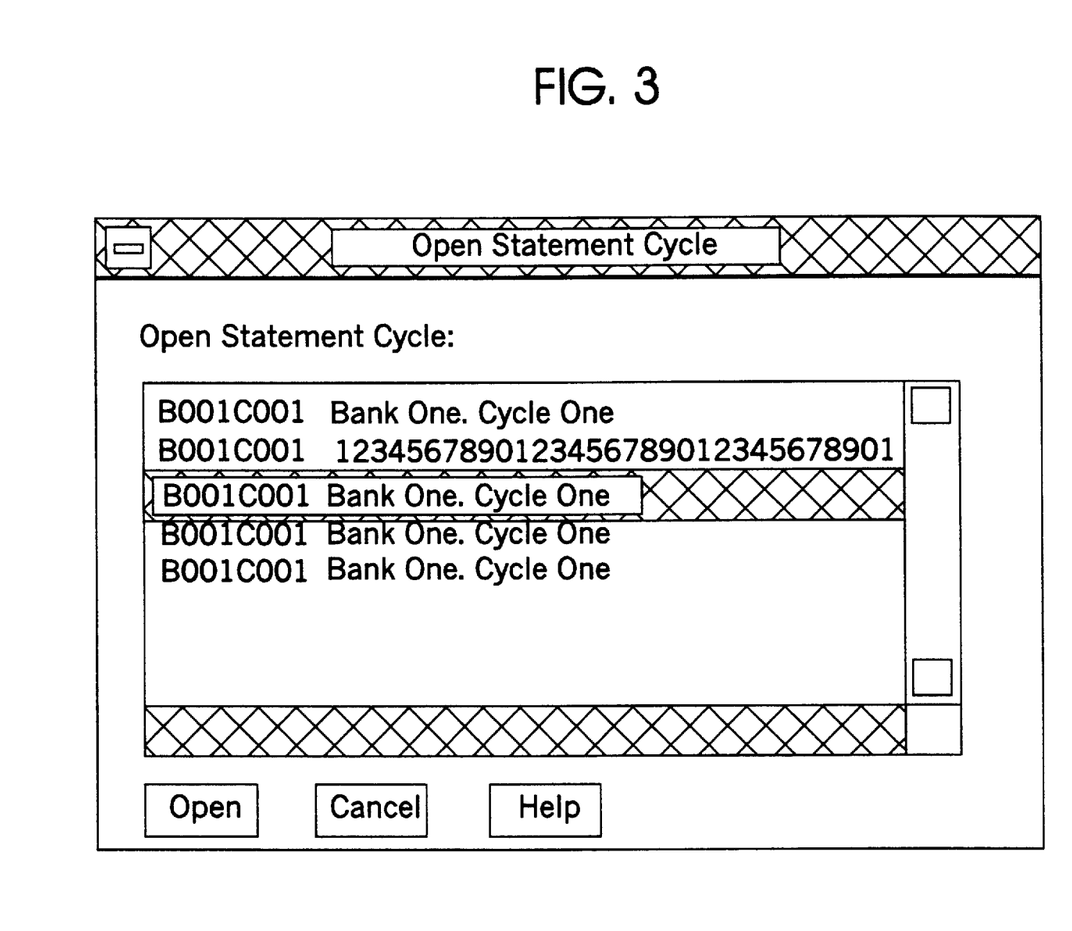
FIG. 3 is a display of an Open Statement Cycle screen displayed at a workstation of the image statements preparation system.
Figure 4:
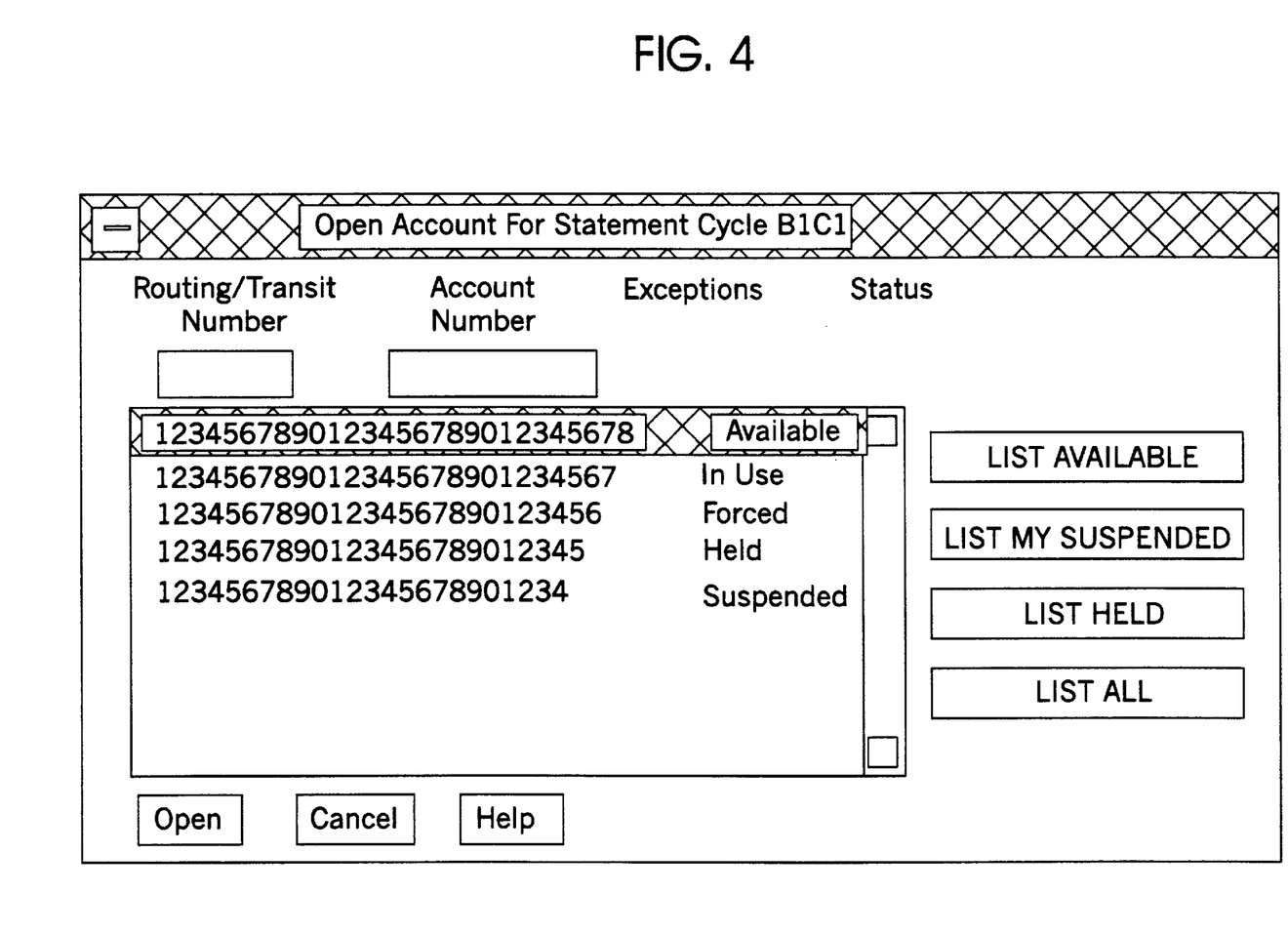
FIG. 4 is a display of an Open Account for a designated Statement Cycle screen displayed at a workstation of the image statements preparation system.

For example, the SIS workstation operator is presented with an open statement cycle selection menu, such as shown in FIG. 3, when a statement reconciliation function is chosen at the SIS workstation. Access to statement cycles is controlled by presenting only those statement cycle names that the operator has authority to use, as defined by the statement operator profile of FIG. 2C. Selection of statement cycles from a displayed list such as shown in FIG. 3 causes the selected statement cycle to be activated. Once activated, individual accounts contained in that statement cycle can be opened for reconciliation work by selection from the displayed list of accounts of the activated statement cycle as shown in FIG. 4. This provides an access means at the proper skill level for all operators involved and allows full access to all authorized statement cycles. The SIS workstation operator then chooses from the list of accounts (retrieved from the ASF) an account on which to perform image reconciliation.

Figure 5:
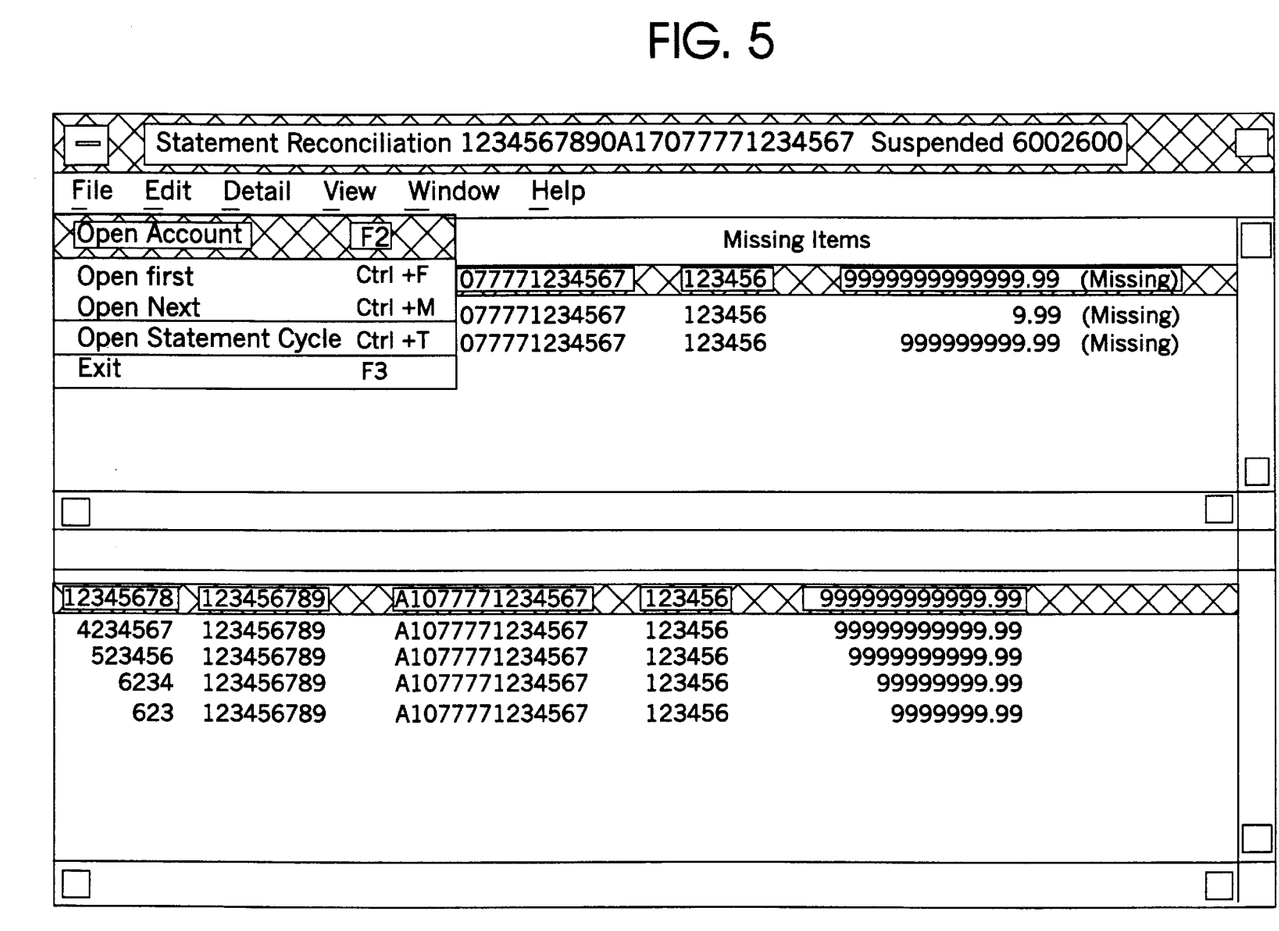
FIG. 5 is a display of a Statement Reconciliation screen displayed at a workstation of the image statements preparation system.

As shown in FIG. 5, a statement reconciliation display for a selected account lists at the top "Missing Items", i.e., items in the account statement for which there are no images. "Free Items", i.e., image items not assigned to a corresponding account transaction, are listed at the bottom of the display so that the SIS operator can readily perform visual matching of available free items to missing items. In the statement reconciliation mode of the SIS, actual images of documents as recorded by the CPCS may be displayed upon a SIS workstation monitor, in the manner described in commonly owned U.S. Pat. No. 5,040,227, the disclosure of which is hereby fully incorporated by reference.

Referring again to FIG. 1, image requests made at the SIS workstation are sent through the SIS host to an image access key file (IAKF) 48 which contains image data for each account, acquired from the match operation 26 and retrievable from the SIS workstation (through the SIS host) for on-screen visual reconciliation, e.g., assignment of missing and free image items to corresponding statements. In the case of missing images, a scanner 50 is linked to the SIS workstation to load images of discovered missing items, which image data is then stored in the CIMS database 16. Completed statements are coded as such in the ASF for forwarding to a format image statement (FIS) program 52 which formats the statement images for printing from a merged image print file (MIPF) 54 (statement print file merged with images) as described below.

Figures 6, 6A:
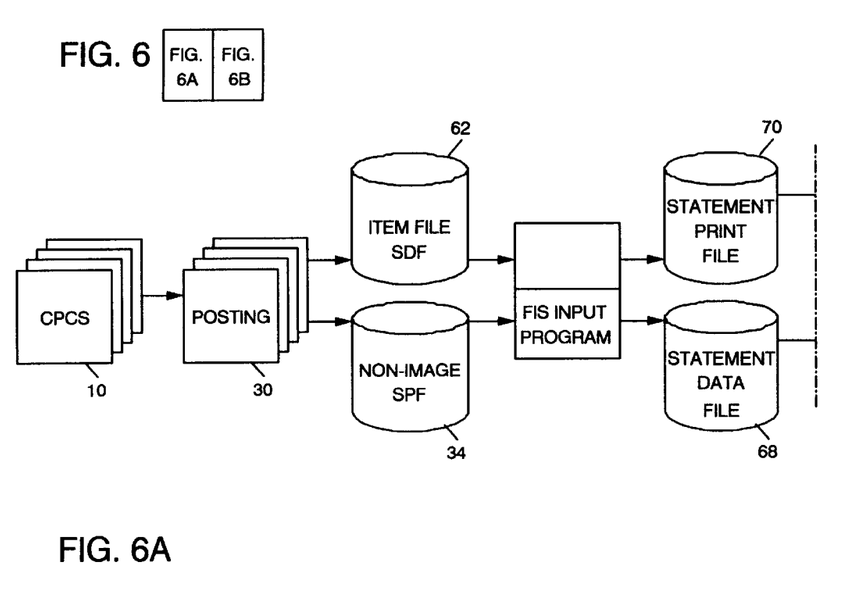
FIGS. 6, 6a & 6b are a schematic illustration of processing operations of an image statements preparation system.
Figure 6B:
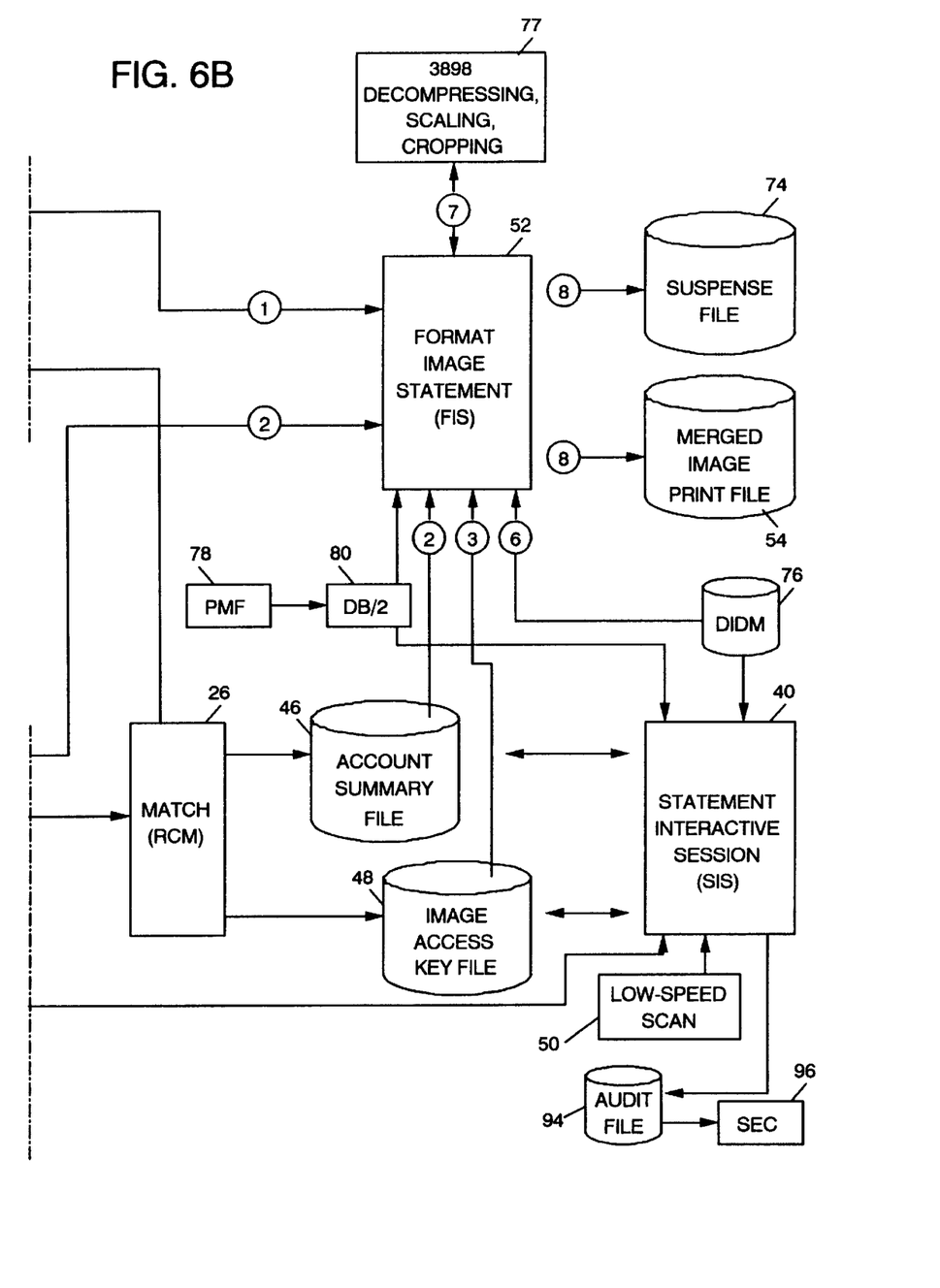
Figure 6C:
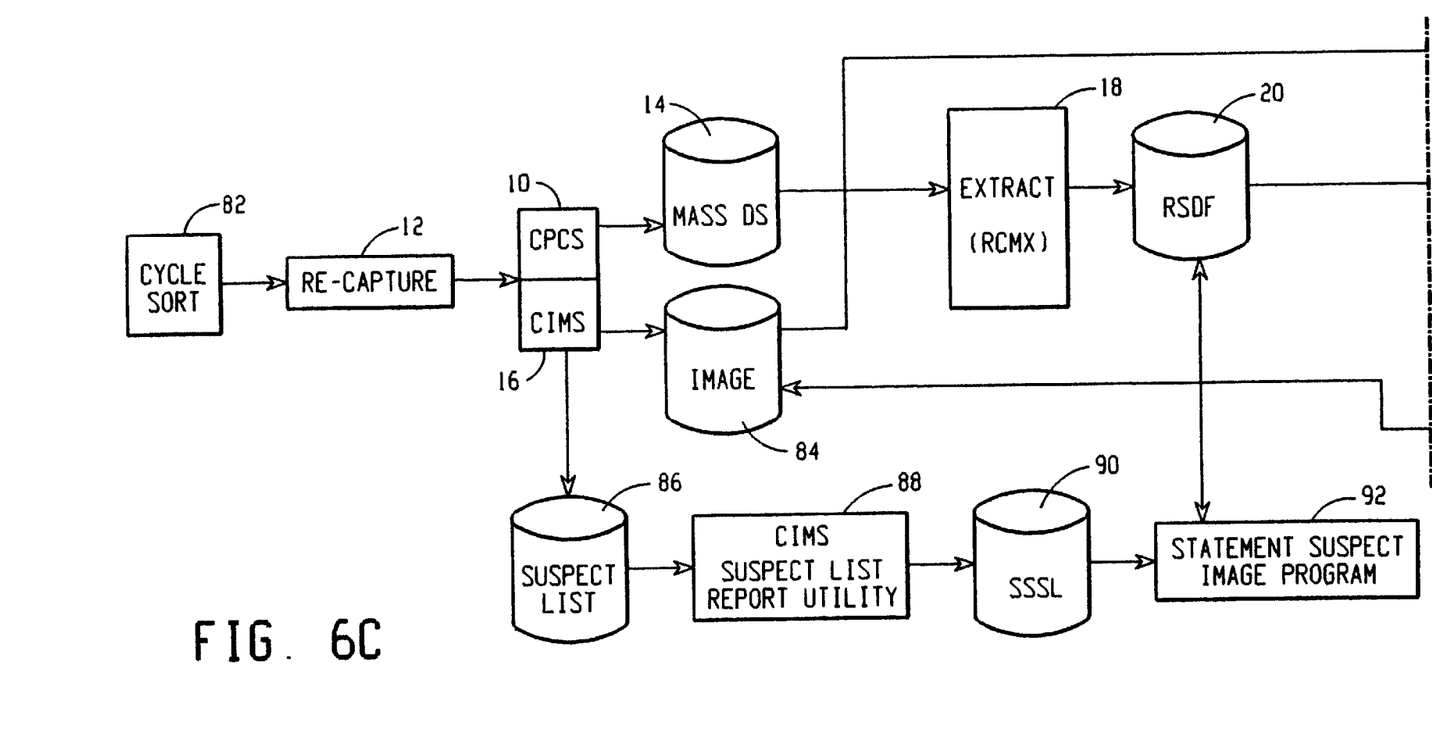

FIG. 6 further diagrams statement data flow in the HPTS in which accumulated document data managed by the CPCS 10 is posted by CPSS 30 which segregates data into a SDF 62, for those statements on which document images are to be printed, and the non-image SPF 34. The SDF 62 is in this embodiment reformatted by for example a custom image marking program 65 into an item print format combinable with image printing to create an image compatible SPF 70 which is sent to the FIS program 52. The non-image SPF 34 is modified by an FIS input program 66 which adds image markers to the data to provide an image-marked SDF 68 which is sent to the match program 26 for matching of corresponding images, to the ASF 46, and to the FIS program 52 for formatting for printing.

A suspense file 74 is provided as a recovery procedure to receive from the FIS program statements which could not be completely assembled due to, for example, a missing item, mismatched items, or a mechanical and/or software glitch. A document image description manager (DIDM) 76 prepares an extract which identifies documents by type (e.g., size) for selection of FIS operations on the document image such as for example decompression, scaling, rotating, or cropping as may be performed by an image editor 77 such as an IBM 3898 Image Processor, a stand alone unit attachable to the system mainframe by direct channel or token ring, to offload image processing tasks from the mainframe and optimize spatial and visual formatting of the images upon the statement.

Figure 7:
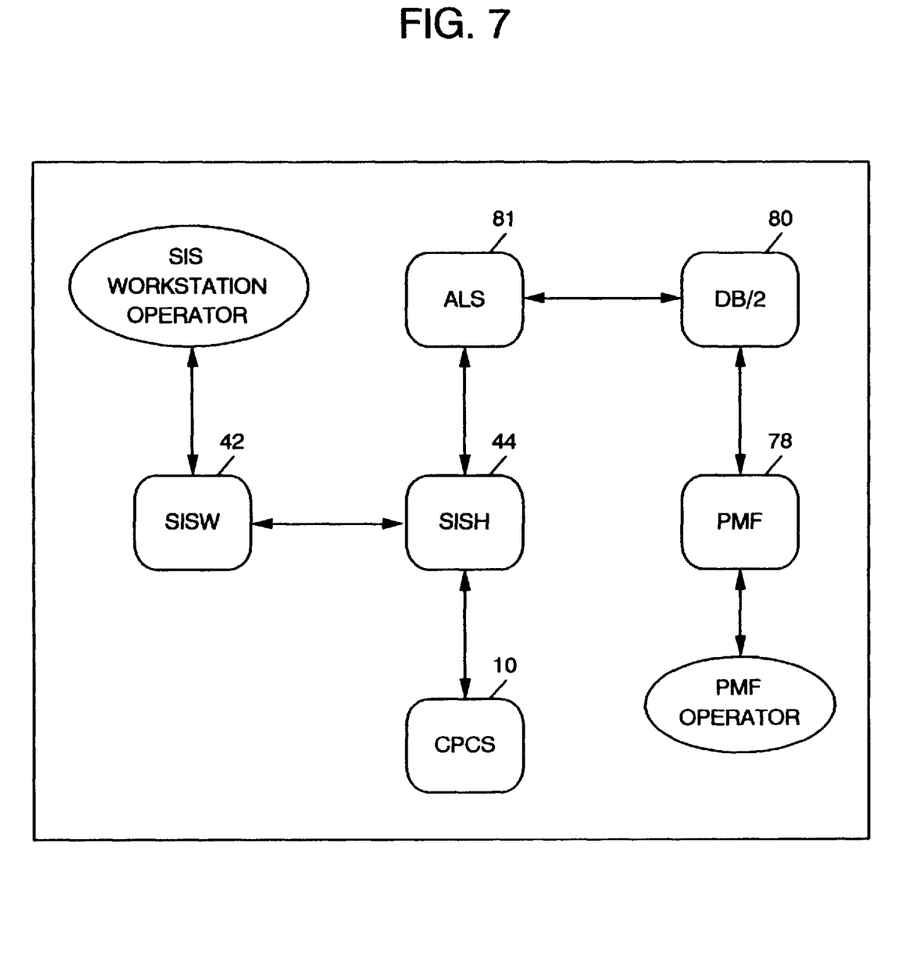
FIG. 7 is a schematic illustration of data interconnections between various processing components of an image statements preparation system in connection with a check processing control system.

As previously noted, a profile management facility (PMF) 78 is included in the system to provide interactive selection of program parameter options on a PMF operator display. As schematically illustrated by FIG. 7, PMF operator-input profile parameters are stored in the host DB/2 database 80 for access by the ALS 81 and the SIS host 44. For example, any statement profile the user desires such as page layout, caption text, image arrangement and header or footer text on the image page, can be input in the form of custom profiles through the PMF 78 and stored in DB/2 database 80 for access and implementation by the SIS and FIS.

Referring now to the bottom portion of FIG. 6, data flow into the SIS begins with a cycle sort operation 82 in which documents for a single statement cycle are segregated by sorting and the MICR and image data of items for these documents recaptured at 12 (as previously described with reference to FIG. 1). MICR data for imaged items is numbered and sent by the CPCS to the MDS 14 and the extract program 18 to compile the recaptured statement data file 20

(image identification plus MICR data) for loading to image/ MICR match operation 26, the results of which are sent to the ASF 46 and the FIS 52, all as previously described with reference to FIG. 1.

Acceptable image items in the CIMS 16 are processed by an image processor 84 and transferred to the FIS 52. Defective images, due for example to hardware failure or a non-scannable image pattern, are detected by the imaging hardware and identified in a suspect image list 86. All of the items on the suspect image list can then be treated by the FIS program as missing items, i.e. items for which no image exists in a CIMS suspect list report utility 88 so that such items may be rescanned. A statement suspect image (SSI) program 92 retrieves from suspect list storage 90 a list of suspect images corresponding to a particular statement cycle and rewrites non-corresponding items back to the suspect list storage 90. Output of the SSI program 92 then modifies the RSDF 20 to block out suspect images until an acceptable image is supplied through a repeat scanning operation, such as by slow speed scanner 50. An audit file 94 compiles a record of the statements operations of the HPTS and produces a statement end cycle report 96 for systems monitoring.

Thus a system and method for image statements production processing is described whereby multiple concurrent statement cycles can be parallel processed as defined statement cycles selectable and accessible through a SIS workstation by entry of statement cycle names and operator access codes, and whereby statement image reconciliation work can be performed at the SIS workstation which also provides means for uploading image data of missing items.

Although the invention has been described with respect to a certain preferred embodiment, equivalent process steps performed by alteration of sequences or operations which may occur to those skilled in the art are all within the scope of this invention.

We claim:

1. A process for preparing account statements for a plurality of accounts having different cycles comprising the steps of:
    a) grouping accounts in statement cycles,
    b) assigning control profiles to each of said statement cycles, said control profiles including at least a name, access authorization, and selection and recovery protection codes for each of said statement cycles,
    c) selecting a statement cycle for which account statements are to be prepared,
    d) performing a statement reconciliation operation through a statement interactive session on exception accounts within said selected statement cycles to reconcile said exception accounts,
    e) producing final printed statements of accounts of a statement cycle,
    f) assigning statement profiles for the statement cycles to be prepared, and
    g) displaying said control profiles on a statement interactive session workstation display.

2. The process of claim 1 wherein the steps of selecting a statement cycle and performing a statement interactive session are done through an operator workstation.

3. The process of claim 1 further comprising the steps of,
    a) creating input data sets by a statements extract program for statements of said statement cycles,
    b) using said input data sets to perform a statements match operation whereby data acquired by an automatic check processing machine is matched to statements of the selected statement cycle.

4. The process of claim 1 further comprising the step of initiating said statement extract program by input of a selected statement cycle name.

5. The process of claim 1 wherein said statement interactive session includes the step of displaying a statement cycle selection menu when a statement reconciliation function is selected by a statement interactive session operator.

6. The process of claim 1 further comprising the step of requiring operator input of assigned access codes for access to each statement cycle.

7. The process of claim 5 further comprising the step of activating statement cycles by selection from a displayed statement cycle list.

8. The process of claim 7 further comprising the steps of opening individual accounts by selection from said selected statement cycles and performing reconciliation operations on said individual accounts in a statement interactive session.

9. The process of claim 1 applied to preparation of image statements.

10. The process of claim 9 further comprising the steps of formatting individual accounts within a selected statement cycle for printing by a format image statement program.

11. The process of claim 9 wherein said statement interactive session comprises the steps of,
    generating and displaying a list of exception statements having missing image items at a workstation,
    selecting an exception statement from a list,
    displaying a list of missing image items for a selected statement,
    retrieving a list of free image items for display at the workstation,
    reconciling said exception statements by matching missing image items with free image items displayed at said workstation.

12. The process of claim 10 wherein said statement interactive session further includes scanning and displaying images of free image items at said workstation and reconciling said missing images with a corresponding statement.

13. The process of claim 12 further comprising the step of storing images scanned at the workstation in an image database.

14. The process of claim 11 further comprising the step of sending lists of missing and free image items to the workstation.

15. A system for preparing a plurality of account statements which have different statement cycles, the system comprising,
    a profile management facility for defining and storing control profile data from which corresponding account statements are grouped, and
    a statements preparation workstation for selecting statements by said control profile data for preparation work on said selected statements, said statements preparation workstation including a display for displaying selected statements, items of selected statements, and said control profile data.

16. The system of claim 15 applied to preparation of image statements and further comprising a document image data management subsystem accessible from the statements preparation workstation so that said displayed items of selected statements includes data of document image items.

17. The system of claim 15 in combination with an automated document processing system which acquires and supplies data used in preparation of said statements.

18. An image statements preparation and reconciliation system for preparing a plurality of image statements having different statement cycles, the system comprising:

- a profile management facility for defining and entering system profiles including statement cycle group profiles for grouping statements to be prepared,
- a non-image data storage device for storing items of non-image data of said statements,
- an image item data storage device for storing items of image data of said statements,
- a statements interactive session workstation for selecting and accessing statements by said statement group profiles and for viewing items of data of said selected statements,
- a statements interactive session workstation display for displaying items of data of said selected statements,
- a statements interactive session workstation input device for inputting instructions for assignment of displayed items of data to a selected account,
- a format image statement program for formatting data of an image statement to produce a merged image print file for printing of formatted image statements, and
- a data link between the statement interactive workstation and the format image statement program.

19. The system of claim 18 in combination with an automated document processing system which includes alpha-numeric and image data capture apparatus.

20. A method for establishing control information for an image statement preparation system, the method comprising the steps of:

a) displaying a control profile table window on a display,
b) storing control profile data in a memory,
c) displaying a statement cycle window on a display,
d) processing all data associated with a selected statement cycle according to said stored control profile data,
e) matching document images to said selected statement cycle, and
f) printing an image statement.

21. The method of claim 20 wherein the step of displaying a control profile table window on a display includes the step of displaying a statement profile table window on said display.

* * * * *